United States Patent [19]

Witzeman et al.

[11] Patent Number: 4,973,646

[45] Date of Patent: Nov. 27, 1990

[54] POWDER COATING COMPOSITIONS

[75] Inventors: Jonathan S. Witzeman; Yeong-Ho Chang, both of Kingsport, Tenn.

[73] Assignee: Eastman Kodak Company, Rochester, N.Y.

[21] Appl. No.: 506,055

[22] Filed: Apr. 9, 1990

[51] Int. Cl.$^5$ ............................................. C08G 18/30
[52] U.S. Cl. ....................... 428/45; 528/48; 528/58; 528/75; 528/80; 528/83; 528/272; 528/274; 528/283; 528/300; 528/302; 528/308; 528/308.6; 525/437; 525/440; 525/444; 525/445; 525/448; 525/454; 525/455; 525/471; 428/423.1; 428/430; 428/458; 428/480
[58] Field of Search .............. 528/45, 48, 58, 75, 528/80, 83, 272, 274, 283, 300, 302, 308, 308.6; 525/437, 440, 445, 448, 454, 455, 471; 428/423.1, 430, 458, 480

[56] References Cited

U.S. PATENT DOCUMENTS

| | | | |
|---|---|---|---|
| 3,822,240 | 7/1974 | Schmitt et al. | 428/402 |
| 4,012,363 | 3/1977 | Brüning et al. | 528/308 |
| 4,150,211 | 4/1979 | Müller et al. | 528/45 |
| 4,212,962 | 7/1980 | Schmitt et al. | 528/45 |
| 4,352,924 | 10/1982 | Wooten et al. | 528/302 |
| 4,387,214 | 7/1983 | Passmore et al. | 528/296 |
| 4,442,270 | 4/1984 | Passmore et al. | 525/440 |
| 4,859,760 | 8/1989 | Light, Jr. et al. | 528/45 |

*Primary Examiner*—John Kight, III.
*Assistant Examiner*—Sam A. Acquah
*Attorney, Agent, or Firm*—J. Frederick Thomsen; William P. Heath, Jr.

[57] ABSTRACT

Disclosed are thermosetting, powder coating compositions comprised of semi-crystalline polyesters and ε-caprolactam-blocked bis(1-cyanato-1-methylethyl) benzene compounds which are readily curable at relatively-mild temperatures and using cure times commonly used to cure (cross-link) powder coatings. When using equivalent curing conditions, the disclosed coating compositions exhibit a higher degree of cross-linking than do combinations of amorphous polyesters and the ε-caprolactam-blocked bis(1-cyanato-1-methylethyl)-benzene compounds.

17 Claims, No Drawings

POWDER COATING COMPOSITIONS

This invention pertains to novel polymer blends useful in the preparation of powder coating compositions. More particularly, this invention pertains to novel polymer compositions comprising one or more semi-crystalline polyesters, an ε-caprolactamblocked bis(1-isocyanato-1-methylethyl)benzene and, optionally, one or more amorphous polyesters. This invention also pertains to powder coating compositions based on the polymer compositions and coatings produced from the powder coating compositions.

Thermosetting powder coating compositions are used extensively to produce durable protective coatings on various materials. Thermosetting coatings, when compared to coatings derived from thermoplastic compositions, generally are tougher, more resistant to solvents and detergents, have better adhesion to metal substrates, and do not soften when exposed to elevated temperatures. However, the curing of thermosetting coatings has created problems in obtaining coatings which have, in addition to the above-stated desirable characteristics, good smoothness and flexibility. Coatings prepared from thermosetting powder compositions, upon the application of heat, may cure or set prior to forming a smooth coating, resulting in a relatively rough or non-uniform finish. Such a coating surface or finish lacks the gloss and luster of coatings typically obtained from thermoplastic compositions. The rough or non-uniform surface problem has caused thermosetting coatings to be applied from organic solvent systems which are inherently undesirable because of the environmental and safety problems occasioned by the evaporation of the solvent system. Solvent-based coating compositions also suffer from the disadvantage of relatively poor percent utilization, i.e., in some modes of application, only 60 percent or less of the solvent-based coating composition being applied contacts the article or substrate being coated. Thus, a substantial portion of solvent-based coatings can be wasted since that portion which does not contact the article or substrate being coated obviously cannot be reclaimed.

To produce smooth, glossy, uniform coatings, the polymeric materials constituting powder coating compositions must melt within a particular temperature range to permit timely and ample flow of the polymeric material prior to the occurrence of any significant degree of curing, i.e., cross-linking. Powder coating compositions which possess the requisite melting range provide smooth and glossy coatings upon being heated to cure the compositions. In addition to being smooth and glossy, coatings derived from thermosetting coating compositions should exhibit or possess good impact strength, hardness, flexibility, and resistance to solvents and chemicals. For example, good flexibility is essential for powder coating compositions used to coat sheet (coil) steel which is destined to be formed or shaped into articles used in the manufacture of various household appliances and automobiles wherein the sheet metal is flexed or bent at various angles.

It is essential that powder coating compositions remain in a free-flowing, finely divided state for a reasonable period after they are manufactured and packaged. Thus, amorphous polyesters utilized in powder coating formulations desirably possess a glass transition temperature (Tg) higher than the storage temperatures to which the formulations will be exposed. Semi-crystalline polyesters and blends thereof with amorphous polyesters also may be utilized in powder coating formulations. For this application, semi-crystalline polyesters desirably possess a significant degree of crystallinity to prevent caking or sintering of the powder for a reasonable period of time prior to its application to a substrate. Semi-crystalline polyesters used in powder coating formulations also must have melting temperatures low enough to permit the compounding of the powder coating formulation without causing the cross-linking agent to react prematurely with the polyesters. The lower melting temperature of the semi-crystalline polyester also is important to achieving good flow of the coating prior to curing and thus aids the production of smooth and glossy coatings.

Finally, the production of tough coatings which are resistant to solvents and chemicals requires adequate cross-linking of the powder coating compositions at curing temperatures and times commonly employed in the industry. In the curing of powder coating compositions, a coated article typically is heated at a temperature in the range of about 325° to 400° F. (163°–204° C.) for up to about 20 minutes causing the coating particles to melt and flow followed by reaction of the cross-linking (curing) agent with the polyester. The degree of curing may be determined by the methyl ethyl ketone rub test described hereinbelow. Normally, a thermosetting coating is considered to be completely or adequately cross-linked if the coating is capable of sustaining 200 double rubs. It is apparent that the use of lower temperatures and/or shorter curing times to produce adequately cross-linked coatings is very advantageous since higher production rates and/or lower energy costs can be achieved thereby.

Powder coating systems based on hydroxyl polyesters and caprolactam-blocked polyisocyanate cross-linking agents have been used extensively in the coatings industry. The most widely used caprolactam-blocked polyisocyanates are those commonly referred to as ε-caprolactam-blocked isophorone diisocyanate, e.g., those described in U.S. Pat. Nos. 3,822,240, 4,150,211, and 4,212,962. However, the products marketed as ε-caprolactam-blocked isophorone diisocyanate may consist primarily of the blocked, difunctional, monomeric isophorone diisocyanate, i.e., a mixture of the cis and trans isomers of 3-isocyanatomethyl-3,5,5-trimethylcyclohexylisocyanate, the blocked, difunctional dimer thereof, the blocked, trifunctional cyclic trimer thereof or a mixture of the monomeric, dimeric and/or trimeric forms. For example, the blocked polyisocyanate compound used as the cross-linking agent may be a mixture consisting primarily of the ε-caprolactamblocked, difunctional, monomeric isophorone diisocyanate and the ε-caprolactam-blocked, trifunctional cyclic trimer of isophorone diisocyanate. The reaction of the isocyanato groups with the blocking compound is reversible at elevated temperatures, e.g., about 150° C. and above, at which temperature the isocyanato groups are available to react with the hydroxyl groups present on the polyester to form urethane linkages, thereby cross-linking or curing the coating composition.

Powder coating compositions comprising an amorphous polyester and an ε-caprolactam-blocked bis(1-isocyanato-1-methylethyl)benzene cross-linking agent cure at slightly lower temperatures, e.g., about 166° to 149° C. (330° to 300° F.) for 15 to 25 minutes, as compared to the analogous ε-caprolactam-blocked polyisocyanate-containing compositions, but the resulting cured coatings exhibit relatively poor impact strength and flexibility. The combination of the semi-crystalline polyesters described herein with an e-caprolactam-blocked bis(1-isocyanato-1-methylethyl)-benzene cross-linking agent cure at dramatically lower temperatures, e.g., about 135° to 149° C. (275° to 300° F.) for 35 to 20 minutes, and coatings obtained therefrom exhibit substantially improved impact properties.

We have discovered that coatings having good to excellent gloss, hardness, impact strength (toughness), flexibility, and resistance to solvents and chemicals may be obtained by the use of relatively mild curing conditions by the inclusion in powder coating compositions of a combination of a semi-crystalline polyester and a caprolactam-blocked bis(1-isocyanato-1methylethyl)-benzene. The powder coating compositions provided by this invention thus comprise an intimate blend, typically in a finely divided form, of:

(1) a hydroxyl polyester component comprised of:
  (A) 100 to 15 weight percent, based on the weight of the hydroxyl polyester component, of a semi-crystalline polyester having a Tg of less than 50° C., a hydroxyl number of about 20 to 100, an inherent viscosity of about 0.1 to 0.5, a melting range of about 70° to 150° C., a number average molecular weight of about 1500 to 10,000, and a heat of fusion (second heating cycle of DSC) of greater than about 5 cal/g-°C., e.g. 5 to about 20 cal/g-°C.; and
  (B) 0 to 85 weight percent of an amorphous polyester having a glass transition temperature (Tg) of greater than 40° C., a hydroxyl number of about 20 to 100 and an inherent viscosity of about 0.1 to 0.5; and
(2) a cross-linking effective amount of an caprolactam-blocked bis(1-isocyanato-1-methylethyl)benzene, i.e., an adduct of ε-caprolactam and a compound having the structure:

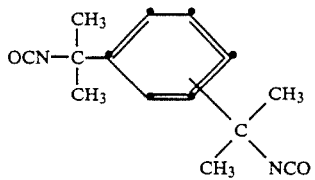

particularly the meta and para isomers.

We have discovered that the above-described semi-crystalline polyester possesses substantially greater reactivity with the above-described cross-linking adduct than is possessed by amorphous polyesters commonly used in powder coating compositions. The presence of the semi-crystalline polyester in the powder coating compositions provided by this invention permits the curing of the coating compositions using lower temperatures and/or shorter periods of time.

Both the amorphous polyester and the semi-crystalline polyester may be produced using well-known polycondensation procedures employing an excess of diol to obtain a polymer having the specified hydroxyl number.

The glycol residues of the amorphous polyester component maybe derived from a wide variety and number of aliphatic, alicyclic and alicyclic-aromatic glycols or diols containing from 2 to about 10 carbon atoms. Examples of such glycols include ethylene glycol, propylene glycol, 1,3-propanediol, 2,4-dimethyl-2-ethylhexane1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, thiodiethanol, 1,2-, 1.3- and 1,4-cyclohexanedimethanol, 2,2,4,4-tetramethyl-1,3-cyclobutanediol, 1,4-xylylene-diol and the like.

The dicarboxylic acid residues of the amorphous polyester may be derived from various aliphatic, alicyclic, aliphatic-alicyclic and aromatic dicarboxylic acids containing about 4 to 10 carbon atoms or ester-forming derivatives thereof such as dialkyl esters and/or anhydrides. Succinic, glutaric, adipic, azelaic, sebacic, fumaric, maleic, itaconic, 1,3- and 1,4-cyclohexanedicarboxylic, phthalic, isophthalic and terephthalic are representative of the dicarboxylic acids from which the diacid residues of the amorphous polyester may be derived. A minor amount, e.g., up to about 10 mole percent, of the glycol and/or diacid residues may be replaced with branching agents, e.g., tri-functional residues derived from trimethylolethane, trimethylolpropane, and trimellitic anhydride.

The preferred amorphous polyester component of the composition provided by this invention has a Tg greater than 55° C., e.g., from 55° to 80° C., a hydroxyl number in the range of about 25 to 80, an acid number of not more than 15 and an inherent viscosity of about 0.15 to 0.4. As used herein, the term "amorphous" refers to a polyester which exhibits no, or only a trace of, crystallization or melting point as determined by differential scanning calorimetry (DSC). The amorphous polyester component preferably is comprised of (1) diacid residues of which at least 50 mole percent are terephthalic acid residues, (2) glycol residues of which at least 50 mole percent are derived from 2,2-dimethyl-1,3-propanediol (neopentyl glycol) and (3) up to 10 mole percent, based on the total moles of (1), (2) and (3), of trimethylolpropane residues. These preferred amorphous polyesters are commercially available, e.g., under the names RUCOTE 107, Cargill Resin 3000, UCB E3145, Hoechst AN745, Scado Uralac 2115 and Uralac 2504, and/or can be prepared according to the procedures described in U.S. Pat. Nos. 3,296,211, 3,842,021, 4,124,570, 4,264,751, and 4,413,079 and Published Japanese Patent Applications (Kokai) No. 73-05,895 and 73-26,292. The most preferred amorphous polyester consists essentially of terephthalic acid residues, 2,2-dimethyl-1,3-propanediol residues and up to 10 mole percent, based on the total moles of trimethylolpropane and 2,2-dimethyl-1,3-propanediol residues, of trimethylolpropane residues and having a Tg of about 50° to 65° C., a hydroxyl number of about 35 to 60, an acid number of less than 10 and an inherent viscosity of about 0.1 to 0.25.

Examples of the semi-crystalline polyesters which may be used in the manufacture of our novel compositions are set forth in U.S. Pat. No. 4,859,760. Suitable semi-crystalline polyesters meeting the criteria set forth hereinabove include polyesters comprised of (1) a diacid component comprised of at least 50, preferably at least 90 mole percent terephthalic or 1,4-cyclohexanedicarboxylic acid residues and (2) diol residues comprised of about 0 to 20 mole percent 2,2-dimethyl-1.3-propanediol residues and about 80 to 100 mole percent of residues of one or more diols having the formula —O—(CH$_2$)$_n$—O— wherein n is 4 to about 12. The semi-crystalline polyester preferably is comprised of (1) diacid residues comprised of (a) about 80 to 98 mole percent terephthalic acid residues and (b) about 2 to 20 mole percent of 1,4-cyclohexanedicarboxylic acid residues, 1,3-cyclohexanedicarboxylic acid residues, adipic acid residues or a mixture thereof, and (2) diol residues comprised of at least about 50 mole percent of residues having the formula —O—$(CH_2)_n$—O— wherein n is 4 to about 12.

The semi-crystalline polyester component, in addition to the residues specified hereinabove, may contain minor amounts, e.g., up to 10 mole percent based upon the total monomer residues of the polyester, of other diacid and diol residues such as the residues of ethylene glycol, propylene glycol, 1,3-propanediol, 2,4-dimethyl-2-ethylhexane-1,3-diol, 2-ethyl-2-butyl-1,3-propanediol, 2-ethyl-2-isobutyl-1,3-propanediol, 1,3-butanediol, thiodiethanol, 1,2-, 1,3- and 1,4-cyclohexanedimethanol, 2,2,4,4-tetramethyl-1,3-cyclobutanediol, 1,4-xylylenediol and residues of succinic, glutaric, adipic, azelaic, sebacic, fumaric, maleic, itaconic, phthalic and/or isophthalic acids. The 1,3- and 1,4-cyclohexane-dicarboxylic acid or the dialkyl esters thereof used in the preparation of the polyesters may be the trans isomer, the cis isomer, or a mixture of such isomers. Preferably, the cis:trans ratio is in the range of about 30:70 to about 70:30.

The semi-crystalline polyester component of our novel compositions preferably has a Tg of less than about 30° C., e.g., about 0° to 30° C., a hydroxyl number of about 30 to 80, an inherent viscosity of about 0.1 to 0.5, a melting range of about 90° to 140° C., and a number average molecular weight of about 2000 to 6000. The heat of fusion (second heating cycle of DSC) of the preferred semi-crystalline polyesters is greater than about 8 cal/g-°C., e.g., from about 8 to 15 cal/g-°C. Semi-crystalline polyesters are those that exhibit an endothermic transition on a differential scanning calorimetry (DSC) scan from low to high temperature. Such a transition also is referred to as melting, a destruction of the orderly arranged molecular structure. The preferred semi-crystalline polyesters comprise (1) diacid residues consisting essentially of about 85 to 95 mole percent terephthalic acid residues and about 5 to 15 mole percent 1,3-cyclohexanedicarboxylic or 1,4-cyclohexanedicarboxylic acid residues, preferably having a trans isomer content of about 35 to 65 mole percent and (2) diol residues consisting essentially of residues having the formula —O—$(CH_2)_n$—O— wherein n is 6 to 12, especially 1,6-hexanediol.

The relative amounts of the amorphous polyester and the semi-crystalline polyester can be varied substantially depending on a number of factors such as the properties and characteristics of the particular amorphous polyester and semi-crystalline polyester employed, the cross-linking agent and the amount thereof being used, the degree of pigment loading, the properties required of the coatings to be prepared from the compositions, etc. In a preferred embodiment of our invention, the hydroxyl polyester component consists of about 40 to 60 weight percent of the semi-crystalline polyester and about 60 to 40 weight percent of the amorphous polyester.

The cross-linking, blocked, diisocyanate compounds in the compositions of this invention may be prepared according to known procedures. Such a cross-linking compound, ε-caprolactam-blocked, 1,3-bis(1-isocyanato-1-methylethyl)benzene, is available from American Cyanamid Company under the name BI-10. The amount of the cross-linking compound can be varied depending on several factors such as those mentioned hereinabove relative to the amounts of amorphous polyester and semi-crystalline polyester utilized. Typically, the amount of cross-linking blocked diisocyanate compound which will effectively cross-link the hydroxy-containing polymers to produce coatings having a good combination of properties is in the range of about 5 to 30 weight percent, preferably 10 to 25 weight percent, based on the total weight of the amorphous polyester, the semi-crystalline polyester and the cross-linking compound.

The powder coating compositions of our invention may be prepared from the compositions described herein by dry-mixing and then melt-blending the semi-crystalline polyester, the amorphous polyester if present and the cross-linking compound, along with other additives commonly used in powder coatings, and then grinding the solidified blend to a particle size, e.g., an average particle size in the range of about 10 to 300 microns, suitable for producing powder coatings. For example, the ingredients of the powder coating composition may be dry blended and then melt blended in a ZSK twin-screw extruder at 90° to 130° C., granulated and finally ground. The melt blending should be carried out at a temperature sufficiently low to prevent the conversion of the cross-linking compound to a reactive form and thus avoid premature cross-linking. To minimize the exposure of the cross-linking compound to elevated temperatures, the amorphous and semi-crystalline polyesters may be blended prior to the incorporation therein of the cross-linking agent.

Typical of the additives which may be present in the powder coating compositions include benzoin, used to reduce entrapped air or volatiles, flow aids or flow control agents which aid the formation of a smooth, glossy surface, catalysts to promote the cross-linking reaction between the isocyanate groups of the cross-linking agent, and the hydroxyl groups on the polymers, stabilizers, pigments, and dyes. Although it is possible to cure or cross-link the composition without the use of a catalyst, it is usually desirable to employ a catalyst to aid the cross-linking reaction, e.g., in an amount of about 0.05 to 2.0 weight percent cross-linking catalyst based on the total weight of the amorphous and semi-crystalline polyesters and the cross-linking agent. Suitable catalysts for promoting the cross-linking include organo-tin compounds such as dibutyltin dilaurate, dibutyltin dimaleate, dibutyltin oxide, stannous octanoate and similar compounds. A particularly effective organo-tin catalyst is 1,3-diacetoxy-1,1,3,3-tetrabutyldistanoxane.

The powder coating compositions preferably contain a flow aid, also referred to as flow control or leveling agents, to enhance the surface appearance of cured coatings of the powder coating compositions. Such flow aids typically comprise acrylic polymers and are available from several suppliers, e.g., Modaflow from Monsanto Company and Acronal from BASF. Other flow control agents which may be used include Modarez MFP available from Synthron, EX 486 available from Troy Chemical, BYK 360P available from BYK Mallinkrodt and Perenol F-30-P available from Henkel. A specific flow aid is an acrylic polymer having a molecular weight of about 17,000 and containing 60 mole percent 2-ethylhexyl methacrylate residues and about 40 mole percent ethyl acrylate residues. The amount of flow aid present may be in the range of about 0.5 to 4.0 weight percent, based on the total weight of the amorphous and semi-crystalline polyesters and the cross-linking agent.

The powder coating compositions may be deposited on various metallic and non-metallic substrates by known techniques for powder deposition such as by means of a powder gun, by electrostatic deposition or by deposition from a fluidized bed. In fluidized bed sintering, a preheated article is immersed into a suspension of the powder coating in air. The particle size of the powder coating composition normally is in the range of 60 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also affects cross-linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coating of 40 to 120 microns thickness may be obtained.

Another method of applying the powder coating compositions is the electrostatic fluidized bed process which is a combination of the two methods described above. For example, annular or partially annular electrodes are mounted over a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross-linking if the article was not preheated to a temperature sufficiently high to cure the coating upon contact of the coating particles with the article.

The powder coating compositions of this invention may be used to coat articles of various shapes and sizes constructed of heat-resistant materials such as glass, ceramic and various metal materials. The compositions are especially useful for producing coatings on articles constructed of metals and metal alloys, particularly steel articles.

The compositions and coatings of our invention are further illustrated by the following examples. The inherent viscosities (I.V.; dl/g) referred to herein were measured at 25° C. using 0.5 g polymer per 100 mL of a solvent consisting of 60 parts by weight phenol and 40 parts by weight tetrachloroethane. Melt viscosities (poise) were determined using an ICI melt viscometer according to ASTM D4287-83. Acid and hydroxyl numbers were determined by titration and are reported herein as mg of KOH consumed for each gram of polymer. The glass transition temperatures (Tg) and the melting temperatures (Tm) were determined by differential scanning calorimetry (DSC) on the second heating cycle at a scanning rate of 20° C. per minute after the sample was heated to melt and quenched to below the Tg of the polymer. Tg values are reported as the midpoint of the transition and Tm at peaks of transitions. The weight average molecular weight (Mw) and number average molecular weight (Mn) were determined by gel permeation chromatography in tetrahydrofuran (THF) using a polystyrene standard and a UV detector.

Coatings were prepared on 3 inch by 9 inch panels of 24-gauge, polished, cold roll steel, the surface of which has been zinc phosphated (Bonderite 37, The Parker Company). Impact strengths were determined using an impact tester (Gardner Laboratory, Inc.) according to ASTM D2794-84. A weight with a $\frac{5}{8}$-inch diameter, hemispherical nose was dropped within a slide tube from a specified height to drive into the front (coated face) or back of the panel. The highest impact which did not crack the coating was recorded in inch-pounds, front and reverse. The 20° and 60° gloss values were measured using a multi-angle, analog laboratory glossmeter.

The solvent resistance and the degree of cure (crosslinking) of the coatings were determined by a methyl ethyl ketone (MEK) rub procedure in which coated panels were rubbed with a two-pound ball peen hammer wrapped with cheese cloth approximately 0.5 inch thick. The cloth was wetted with MEK every 50 double strokes The rubbing was continued until bare metal is observed or until 200 double rubs are completed. The result of each MEK rub procedure is reported as the number of double rubs required for the observation of bare metal or 200, whichever is greater.

The pencil hardness of the coatings was determined according to ASTM 3363-74 (reapproved 1980) and is reported as the hardest lead which does not cut into the coating. The results of the pencil hardness test are expressed according to the following scale: (softest) 6B, 5B, 4B, 3B, 2B, B, HB, F, H, 2H, 3H, 4H, 5H, 6H (hardest). The conical mandrel test is conducted according to ASTM 522-85 by bending a panel over a 15 second period using a conical mandrel (Gardner Laboratory, Inc.) of a specified size. A pass or fail is recorded.

The flexibility of the coatings was determined in accordance with ASTM 4145-83 at ambient temperature by bending or folding a coated panel back against itself, using a hydraulic jack pressurized to 20,000 pounds per square inch (psi), until the apex of the bend is as flat as can be reasonably achieved. This bend is referred to as OT meaning that there is nothing (zero thicknesses) between the bent portions of the panel. The bend is examined using a 10× magnifying glass and a pass is recorded if no fractures of the coating are observed.

The following reference examples describe the preparation of semi-crystalline polyesters which may be employed in the compositions provided by this invention.

REFERENCE EXAMPLE 1

Terephthalic acid (1300.6 g, 7.83 mol) and butanestannoic acid (FASCAT 4100, 2.3 g) were added to a melt of 1,6-hexanediol (849.1 g, 7.19 mol) and trimethylolpropane (132.1 g, 1.27 mol) in a 5 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour. The temperature then was raised to and maintained at 230° C.

until the acid number of the polyester was less than 10. The molten polymer was poured into a syrup can where it was allowed to cool to a white solid. The polyester thus obtained had an I.V. of 0.28, an ICI melt viscosity of 10 poise, a hydroxyl number of 32 and an acid number of 4. Differential scanning calorimetry showed a melting point at 125° C. and a heat of fusion of 1.0 cal/g. The polyester had a weight average molecular weight of 12,710 and a number average molecular weight of 4480.

REFERENCE EXAMPLE 2

Terephthalic acid (1300.6 g, 7.83 mol) and dibutyltin oxide (2.3 g) were added to a melt of 1,6-hexanediol (849.1 g, 7.19 mol) and 2,2-dimethyl-1,3-propanediol (132.1 g, 1.27 mol) in a 5 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour. The temperature then was raised to and maintained at 230° C. until the acid number of the polyester was less than 10. The molten polymer was poured into a syrup can where it was allowed to cool to a white solid. The polyester thus obtained had an I.V. of 0.31, an ICI melt viscosity at 200° C. of 19 poise, a hydroxyl number of 45 and an acid number of 8. Differential scanning calorimetry showed a glass transition temperature at 10° C., a melting point at 126° C., a crystallization temperature at 43° C. and a heat of fusion of 8.0 calories per g. The polyester had a weight average molecular weight of 14,800 and a number average molecular weight of 3819.

REFERENCE EXAMPLE 3

Terephthalic acid (2092.8 g, 12.60 mol), 1,4-cyclohexanedicarboxylic acid (cis:trans=about 60:40, 114.2 g, 0.66 mol), and butanestannoic acid (FASCAT 4100, 3.5 g) were added to a melt of 1,6-hexanediol (1797 g, 15.20 mol) in a 5 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour. The temperature then was raised to and maintained at 230° C. until the acid number of the polyester was less than 10. The molten polymer was poured into a syrup can where it was allowed to cool to a white solid. The polyester thus obtained had an I.V. of 0.224, an ICI melt viscosity at 200° C. of 3.3 poise, a hydroxyl number of 42.5 and an acid number of 2.3. Differential scanning calorimetry showed a melting point at 135° C. and a heat of fusion of 10.9 cal/g. No temperature of crystallization was observed. The crystallization half time from the melt at 95° C. was 11 seconds and at 60° C. was too fast to observe. The polyester had a weight average molecular weight of 9027 and a number average molecular weight of 3666 (Mw/Mn=2.5).

REFERENCE EXAMPLE 4

Terephthalic acid (519.6 g, 3.127 mol) and butanestannoic acid (FASCAT 4100, 0.8 g) were added to a melt of 1,6-hexanediol (370.9 g, 3.139 mol) and 2,2-dimethyl-1,3-propanediol (22.2 g, 0.165 mol) in a 1 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour. The temperature then was raised to and maintained at 230° C. until the acid number of the polyester was less than 10. The molten polymer was poured into a syrup can where it was allowed to cool to a white solid. The polyester thus obtained had an I.V. of 0.30, an ICI melt viscosity at 200° C. of 24 poise, a hydroxyl number of 34 and an acid number of 2. Differential scanning calorimetry showed a melting point at 133° C. and a heat of fusion of 8.9 calories per g. The polyester had a weight average molecular weight of 17,098 and a number average molecular weight of 5344.

REFERENCE EXAMPLE 5

Terephthalic acid (304.0 g, 1.830 mol) and butanestannoic acid (FASCAT 4100, 0.6 g) were added to a melt of 1,10-decanediol (336.1 g, 2.046 mol) and 2,2-dimethyl-1,3-propanediol (11.2 g, 0.106 mol) in a 1 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour. The temperature then was raised to and maintained at 230° C. until the acid number of the polyester was less than 10. The molten polymer was poured into a syrup can where it was allowed to cool to a white solid. The polyester thus obtained had an I.V. of 0.209, an ICI melt viscosity at 200° C. of 2.4 poise, a hydroxyl number of 46 and an acid number of 2. Differential scanning calorimetry showed a melting point at 123° C. and a heat of fusion of 16.0 calories per g. The polyester had a weight average molecular weight of 9786 and a number average molecular weight of 4451.

REFERENCE EXAMPLE 6

The procedure described in Reference Example 5 is repeated substantially using 321.0 g terephthalic acid (3.864 mol), 299.3 g 1,10-decanediol (3.44 mol) and 61.5 g 2,2-dimethyl-1,3-propanediol (1.180 mol). The polyester obtained had an inherent viscosity of 0.239, an ICI melt viscosity at 200° C. of 4 poise, a hydroxyl number of 33 and an acid number of 1.

REFERENCE EXAMPLE 7

Terephthalic acid (360.5 g, 2.17 mol), adipic acid (16.69 g, 0.114 mol) and butanestannoic acid (FASCAT 4100, 0.6 g) were added to a melt of 1,6-hexanediol (309.6 g, 2.62 mol) in a 1 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour. The temperature then was raised to and maintained at 230° C. until the acid number of the polyester was less than 10. The molten polymer was poured into a syrup can where it was allowed to cool to a white solid. The polyester thus obtained had an I.V. of 0.191, an ICI melt viscosity at 200° C. of 3.8 poise, a hydroxyl number of 51.0 and an acid number of 0.4. Differential scanning calorimetry showed a melting point at 139° C., a crystallization temperature of 39° C. and a heat of fusion of 11.8 cal/g. The crystallization half time from the melt at 95° C. was 25 seconds and at 60° C., less than 12 seconds. The polyester had a weight average molecular weight of 7679 and a number average molecular weight of 3564.

REFERENCE EXAMPLE 8

Terephthalic acid (253.87 g, 1.523 mol), 1,4-cyclohexanedicarboxylic acid (cis:trans=about 60:40, 48.4 g, 0.27 mol), and butanestannoic acid (FASCAT 4100, 0.6 g) were added to a melt of 1,10-decanediol (369.9 g, 2.13 mol) in a 5 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour. The temperature then was raised to and maintained at 230° C. until the acid number of the polyester was less than 10. The molten polymer was poured into a syrup can where it was allowed to cool to a white solid. The polyester thus obtained had an I.V. of 0.222, an ICI melt viscosity at 200° C. of 2.4 poise, a hydroxyl number of 43.0 and an acid number of 0.2. Differential scanning calorimetry showed a melting point at 116° C. and a heat of fusion of 15.1 cal/g. No crystallization temperature was observed. The crystallization half time from the melt at 95° C. was 45 seconds and at 60° C., less than 12 seconds. The polyester had a weight average molecular weight of 9746 and a number average molecular weight of 4451.

REFERENCE EXAMPLE 9

Terephthalic acid (284.25 g, 1.711 mol), 1,4-cyclohexanedicarboxylic acid (16.0 g, 0.090 mol) and butanestannoic acid (FASCAT 4100, 0.6 g) were added to a melt of 1,10-decanediol (370.6 g, 2.31 mol) in a 1 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C for 1 hour. The temperature then was raised to and maintained at 230° C. until the acid number of the polyester was less than 10. The molten polymer was poured into a syrup can where it was allowed to cool to a white solid. The polyester thus obtained had an I.V. of 0.236, an ICI melt viscosity at 200° C. of 2.4 poise, a hydroxyl number of 42.0 and an acid number of 0.2. Differential scanning calorimetry showed a melting point at 122° C. and a heat of fusion of 16.0 cal/g. The crystallization half time from the melt at 95° C. was 15 seconds and was too fast to measure at 60° C. The polyester had a weight average molecular weight of 9915 and a number average molecular weight of 4492.

EXAMPLE 1

A powder coating composition was prepared from the following materials:
208.5 g Polyester of Reference Example 3;
625.6 g Amorphous polyester—RUCOTE 107;
165.9 g ε-Caprolactam-blocked 1,3-bis(1-isocyanato-1-methyl-ethyl)benzene
10.0 g Dibutyltin dilaurate;
10.0 g Benzoin;
10.0 g Modaflow flow control agent; and
400.0 g Titanium dioxide.

The above materials were mixed in a Henschel mixer for 15 to 30 seconds and blended in a ZSK-30 twin screw extruder at a screw speed of 250 revolutions per minute. The extruder temperature profile was: feed zone=110° C., die zone=100° C. The extrudate was cooled through a chilled roll and ground in a Bantam mill to which a stream of liquid nitrogen was fed and classified through a 200 mesh screen on an Alpine sieve. The finely-divided, powder coating composition obtained had an average particle size of about 50 microns.

The powder coating composition prepared in Example 1 was applied electrostatically to one side of the 3 inch by 9 inch panels described hereinabove. The coatings were cured (cross-linked) by heating the coated panels in an oven using varying conditions of time and temperature. The curing conditions used in cross-linking each coating, the thickness of the resulting coatings and the properties of the coatings are set forth in Table I wherein the curing conditions are given in °C. and minutes (°C./minutes), coating thickness (Thick) is given in microns, the front and back impact strengths are given in inch pounds (front/back) and the values for the pencil hardness, 0.125 inch conical mandrel, T-bend flexibility and methyl ethyl ketone rub (MEK Rub) tests and the gloss values (20°/60°) are reported as described hereinabove.

EXAMPLES 2–4

The procedures described in Example 1 were repeated using varying amounts of the semi-crystalline polyester, amorphous polyester and ε-caprolactam-blocked 1,3-bis-(1-isocyanato-1-methylethyl)benzene described in Example 1. The amounts of the other five components of the powder coating compositions of Examples 2–4 were the same as those used in Example 1. The amounts (g) of the hydroxyl polyesters and the cross-linking agent employed were:

|  | Example | | |
| --- | --- | --- | --- |
|  | 2 | 3 | 4 |
| Semi-crystalline polyester | 473.4 | 614.8 | 812.8 |
| Amorphous polyester | 473.4 | 208.9 | 0 |
| ε-caprolactam blocked 1,3-bis(1-isocyanato-1-methyl-ethyl)benzene | 173.2 | 180.3 | 187.2 |

The curing conditions used in cross-linking each coating prepared from the compositions of Examples 2, 3 and 4, the thickness of the resulting coatings and the properties of the coatings are set forth in Table I.

EXAMPLE 5

A powder coating composition was prepared from the following materials:
160.0 g Polyester of Reference Example 3;
160.0 g Amorphous polyester—RUCOTE 107;
80.0 g ε-Caprolactam-blocked 1,3-bis(1-isocyanato-1-methyl-ethyl)benzene
4.0 g Dibutyltin dilaurate;
4.0 g Benzoin;
4.0 g Modaflow flow control agent; and
160.0 g Titanium dioxide.

The above materials were mixed and blended in a 15 mm, twin screw extruder at a screw temperature of 120° C. and a screw speed of 200 revolutions per minute. Coatings of this composition were prepared, cured and evaluated as described in Example 1. The curing conditions used in cross-linking each coating prepared from the compositions of Examples 2, 3 and 4, the thickness of the resulting coatings and the properties of the coatings are set forth in Table I.

EXAMPLES 6-8

The procedures described in Example 5 were repeated with the following variations:

| | |
|---|---|
| Example 6: | The dibutyltin dilaurate catalyst was replaced with 1,3-diacetoxy-1,1,3,3-tetrabutyldistanoxane (4.0 g). |
| Example 7: | The semi-crystalline polyester was replaced with the polyester (160.0 g) of Reference Example 4. |
| Example 8: | The dibutyltin dilaurate catalyst was replaced with 1,3-diacetoxy-1,1,3,3-tetrabutyldistanoxane (4.0 g) and the semi-crystalline polyester was replaced with the polyester (160.0 g) of Reference Example 4. |

The curing conditions used in cross-linking each coating prepared from the compositions of Examples 6, 7 and 8, the thickness of the resulting coatings and the properties of the coatings are set forth in Table I.

The Table I data for Examples 5-8 show that the use of the more active 1,3-diacetoxy-1,1,3,3-tetrabutyldistanoxane catalyst lowers the required time of cure at 135° C. by at least 10-15 minutes.

EXAMPLE 9

The procedures of Example 5 were repeated using the following materials:
160.0 g Polyester of Reference Example 5;
160.0 g Amorphous polyester—RUCOTE 107;
80.0 g ε-Caprolactam-blocked 1,3-bis(1-isocyanato-1-methylethyl)benzene
4.0 g Dibutyltin dilaurate;
4.0 g Benzoin;
4.0 g Modaflow flow control agent; and
160.0 g Titanium dioxide.

Coatings of this composition were prepared, cured and evaluated as described in Example 5. The curing conditions used in cross-linking each coating prepared from this composition, the thickness of the resulting coatings and the properties of the coatings are set forth in Table I.

EXAMPLE 10

Example 9 was repeated using the following materials:
164.0 g Polyester of Reference Example 6;
164.0 g Amorphous polyester—RUCOTE 107;
72.0 g ε-Caprolactam-blocked 1,3-bis(1-isocyanato-1methylethyl)benzene
4.0 g Dibutyltin dilaurate;
4.0 g Benzoin;
4.0 g Modaflow flow control agent; and
160.0 g Titanium dioxide.

Coatings of this composition were prepared, cured and evaluated as described in Example 5. The curing conditions used in cross-linking each coating prepared from this composition, the thickness of the resulting coatings and the properties of the coatings are set forth in Table I.

COMPARATIVE EXAMPLE 1

A powder coating composition was prepared from the following materials:
841.4 g Amorphous polyester—RUCOTE 107;
158.6 g ε-Caprolactam-blocked 1,3-bis(1-isocyanato-1-methylethyl)benzene
10.0 g Dibutyltin dilaurate;
10.0 g Benzoin;
10.0 g Modaflow flow control agent; and
400.0 g Titanium dioxide.

The above materials were mixed, blended and pulverized and used to coat steel panels, all as described in Example 1. The curing conditions used in cross-linking each coating prepared from this composition, the thickness of the resulting coatings and the properties of the coatings are set forth in Table I.

The data set forth in Table I for the coatings prepared from the composition of this example (C-1) show that the composition cures at approximately 149° C. but that the cured coatings had unacceptable impact strength and flexibility.

COMPARATIVE EXAMPLE 2

A powder coating composition was prepared from the following materials:
353.4 g Polyester of Reference Example 1;
46.6 g ε-Caprolactam-blocked isophorone diisocyanatye-based polyisocyanate—Hüls 1530
4.0 g Dibutyltin dilaurate;
4.0 g Benzoin;
4.0 g Modaflow flow control agent; and
200.0 g Titanium dioxide.

These materials were melt blended in a Banbury mixer, granulated, ground and classified. Coatings of this composition were prepared, cured and evaluated as described in Example 1. The curing conditions used in cross-linking each coating prepared from this composition, the thickness of the resulting coatings and the properties of the coatings are set forth in Table I.

The properties exhibited by the cured coatings of this composition show no significant reduction in the temperature required for curing and, while the coatings exhibit good impact resistance and flexibility, they are undesirably soft.

COMPARATIVE EXAMPLE 3

A powder coating composition was prepared from the following materials:
1407.0 g Polyester of Reference Example 1;
337.0 g ε-Caprolactam-blocked isophorone diisocyanate-based polyisocyanate—Hüls 1530
17.5 g Dibutyltin dilaurate;
17.5 g Benzoin;
20.9 g Modaflow flow control agent; and
1200.0 g Titanium dioxide.

The above materials were mixed in a Henschel mixer for 15 to 30 seconds and blended in a ZSK-30 twin screw extruder at a screw speed of 300 revolutions per minute. The extruder temperature profile was: feed zone=130° C., die zone=120° C. The composition obtained was granulated, ground, classified and the powder coating composition thus prepared was coated on steel panels as described in Example 1. The curing conditions used in cross-linking each coating prepared from this composition, the thickness of the resulting coatings and the properties of the coatings are set forth in Table I.

The poor chemical resistance (MEK rub test) and impact strength exhibited by the cured coating prepared from the composition of this example establish that the composition was not effectively cured by the low temperature cure conditions.

COMPARATIVE EXAMPLE 4

A powder coating composition was prepared from the following materials:
288.0 g Polyester of Reference Example 5;
672.0 g ε-Caprolactam-blocked isophorone diisocyanate-based polyisocyanate—Hüls 1530
12.0 g Dibutyltin dilaurate;
12.0 g Benzoin;
18.0 g Modaflow flow control agent; and
600.0 g Titanium dioxide.

The above materials were mixed in a Henschel mixer for 15 to 30 seconds and blended in a Buss extruder with an 11D barrel design at a screw speed of 80 revolutions per minute. The extruder temperature profile was: zone 1=135° C. (end of the barrel), zone 2=75° C., zone 3=25° C., die head=93° C. The composition obtained was granulated, ground, classified and the powder coating composition thus prepared was coated onsteel panels as described in Example 1. The curing conditions used in cross-linking each coating prepared from this composition, the thickness of the resulting coatings and the properties of the coatings are set forth in Table I.

COMPARATIVE EXAMPLE 5

A powder coating composition was prepared from the following materials:
68.8 g Polyester of Reference Example 6;
265.6 g Amorphous polyester—AZS 50
65.6 g ε-Caprolactam-blocked polyisocyanate—Cargill 2400
4.0 g Dibutyltin dilaurate;
2.0 g Benzoin;
4.0 g Modaflow flow control agent; and
160.0 g Titanium dioxide.

These materials were melt blended in a Banbury mixer, granulated, ground and classified. Coatings of this composition were prepared, cured and evaluated as described in Example 1. The curing conditions used in cross-linking each coating prepared from this composition and the properties of the coatings are set forth in Table I.

TABLE I

| Example | Cure Conditions | Thick | Impact Strength | Pencil Hardness | Conical Mandrel | T Bend | MEK Rub | Gloss 20°/60° |
|---|---|---|---|---|---|---|---|---|
| 1 | 177/25 | 51 | 40/<20 | H | Pass | 3T | >200 | 88/98 |
| 1 | 166/25 | 53 | 40/20 | H | Pass | 1T | >200 | 86/97 |
| 1 | 149/25 | 51 | 160/160 | HB | Pass | 1T | >200 | 86/97 |
| 1 | 135/35 | 43 | 40/<20 | F | Pass | Fail | >200 | 87/96 |
| 1 | 135/25 | 51 | 20/<20 | F | Fail | Fail | <100 | 86/96 |
| 2 | 191/20 | 48 | 160/160 | F | Pass | OT | >200 | 83/97 |
| 2 | 177/25 | 51 | 160/160 | HB | Pass | OT | >200 | 73/95 |
| 2 | 166/25 | 48 | 160/160 | HB | Pass | OT | >200 | 82/95 |
| 2 | 149/25 | 53 | 160/160 | HB | Pass | OT | >200 | 88/97 |
| 2 | 135/35 | 51 | 160/160 | F | Pass | OT | >200 | 95/98 |
| 2 | 135/25 | 46 | 20/<20 | — | Pass | OT | <20 | 94/95 |
| 3 | 177/25 | 51 | 160/160 | B | Pass | OT | >200 | 38/79 |
| 3 | 166/25 | 48 | 160/160 | B | Pass | OT | >200 | 32/73 |
| 3 | 149/25 | 51 | 160/160 | B | Pass | OT | >200 | 35/75 |
| 3 | 135/35 | 51 | 160/160 | B | Pass | OT | >200 | 44/82 |
| 3 | 135/25 | 46 | 160/160 | — | — | — | <50 | 45/83 |
| 4 | 177/25 | 102 | 20/<20 | HB | Pass | Fail | >200 | 20/58 |
| 4 | 166/25 | 112 | 160/160 | HB | Pass | Fail | >200 | 16/45 |
| 4 | 135/35 | 46 | 160/160 | 2B | Pass | Fail | >200 | 20/50 |
| 4 | 135/25 | 94 | <20/<20 | — | — | — | >200 | — |
| 5 | 177/20 | 53 | 80/<20 | B | Pass | 3T | >200 | 16/50 |
| 5 | 163/20 | 30 | 160/80 | B | Pass | OT | >200 | 23/63 |
| 5 | 149/20 | 46 | 80/<20 | B | Pass | 1T | >200 | 24/62 |
| 5 | 135/35 | 43 | 60/<20 | — | Pass | — | >200 | 24/64 |
| 5 | 135/25 | 56 | 20/<20 | — | — | — | <200 | 26/63 |
| 5 | 135/20 | 48 | 20/<20 | — | — | — | <30 | 34/76 |
| 6 | 149/25 | 51 | 160/160 | Hb | Pass | OT | >200 | 35/75 |
| 6 | 149/20 | 56 | 160/160 | B | Pass | OT | >200 | 39/79 |
| 6 | 135/35 | 58 | 160/160 | F | — | 1T | >200 | 46/82 |
| 6 | 135/30 | 51 | 160/160 | F | — | 1T | >200 | 36/71 |
| 6 | 135/25 | 53 | 160/80 | F | — | — | >200 | 30/70 |
| 6 | 135/20 | 46 | 40/<20 | F | — | — | <180 | 42/78 |
| 7 | 149/20 | 56 | 160/160 | F | Pass | OT | >200 | 48/84 |
| 7 | 135/30 | 56 | 160/160 | F | Pass | 1T | >200 | 52/86 |
| 7 | 135/20 | 56 | 40/<20 | F | Pass | 2T | >200 | 49/86 |
| 8 | 149/25 | 48 | 100/<40 | F | Pass | 5T | >200 | 22/56 |
| 8 | 149/20 | 51 | 120/<60 | F | Pass | 5T | >200 | 21/55 |
| 8 | 135/35 | 56 | 60/20 | F | — | 4T | >200 | 22/58 |
| 8 | 135/30 | 51 | 80/<20 | F | — | 5T | >200 | 22/57 |
| 8 | 135/25 | 56 | 40/<20 | F | Pass | 5T | >200 | 20/55 |
| 8 | 135/20 | 48 | 60/<20 | F | Pass | Fail | <200 | 23/58 |
| 9 | 149/20 | 53 | 160/160 | HB | Pass | OT | >200 | 4/16 |
| 9 | 135/30 | 51 | 160/160 | HB | Pass | 1T | >200 | 5/18 |
| 9 | 135/20 | 56 | 160/160 | HB | — | 3T | >200 | 5/19 |
| 9 | 135/20 | 51 | 80/<20 | HB | — | 4T | <180 | 5/19 |
| 10 | 149/20 | 48 | 160/160 | F | Pass | 1T | >200 | 4/16 |
| 10 | 135/25 | 38 | 160/160 | HB | Pass | 2T | >200 | 5/17 |
| 10 | 135/20 | 76 | 20/<20 | HB | — | 4T | <200 | 6/21 |
| C-1 | 177/25 | 51 | 40/<20 | F | Fail | Fail | >200 | 79/94 |
| C-1 | 166/25 | 51 | 40/<20 | F | Fail | 5T | >200 | 82/96 |
| C-1 | 149/25 | 46 | 40/<20 | F | Fail | 6T | >200 | 79/90 |
| C-1 | 135/25 | 53 | 20/<20 | H | Fail | Fail | <100 | 73/90 |
| C-2 | 177/25 | 51 | 160/160 | 3B | Pass | Pass | >200 | 76/90 |
| C-2 | 166/25 | 43 | 160/160 | 3B | Pass | Pass | <120 | 78/94 |

TABLE I-continued

| Example | Cure Conditions | Thick | Impact Strength | Pencil Hardness | Conical Mandrel | T Bend | MEK Rub | Gloss 20°/60° |
|---|---|---|---|---|---|---|---|---|
| C-2 | 149/25 | 48 | 20/<20 | 3B | Pass | Fail | <20 | 51/83 |
| C-3 | 149/25 | 66 | 20/<20 | 3B | — | — | <100 | 90/94 |
| C-3 | 135/25 | 76 | <20/<20 | 3B | — | — | <20 | 80/92 |
| C-4 | 177/25 | 56 | 160/160 | 2H | Pass | 'OT' | >200 | 79/90 |
| C-5 | 177/25 | — | 160/160 | 2H | Pass | 'OT' | >200 | 85/96 |

The invention has been described in detail with particular reference to preferred embodiments thereof, but it will be understood that variations and modifications will be effected within the spirit and scope of the invention.

We claim:

1. A thermosetting coating composition in the form of a powder having an average particle size of about 10 to 300 microns comprising:
   (1) a hydroxyl polyester component comprised of a semi-crystalline polyester having a Tg of less than 50° C., a hydroxyl number of about 20 to 100, an inherent viscosity of about 0.1 to 0.5, a melting range of about 70° to 150° C., a number average molecular weight of about 1500 to 10,000 and a heat of fusion (second heating cycle of DSC) of greater than about 5 cal/g-°C., e.g. 5 to about 20 cal/g-°C.; and
   (2) a cross-linking effective amount of an ε-caprolactam-blocked bis(1-isocyanato-1-methylethyl)benzene.

2. A thermosetting coating composition according to claim 1 comprising:
   (1) a hydroxyl polyester component comprised of:
      (A) 100 to 15 weight percent, based on the weight of the hydroxyl polyester component, of a semi-crystalline polyester having a Tg of less than 50° C., a hydroxyl number of about 20 to 100, an inherent viscosity of about 0.1 to 0.5, a melting range of about 70° to 150° C., a number average molecular weight of about 1500 to 10,000 and a heat of fusion (second heating cycle of DSC) of greater than about 5 cal/g-°C., e.g. 5 to about 20 cal/g-°C.; and
      (B) 0 to 85 weight percent of an amorphous polyester having a glass transition temperature (Tg) of greater than 40° C., a hydroxyl number of about 20 to 100 and an inherent viscosity of about 0.1 to 0.5; and
   (2) a cross-linking effective amount of ε-caprolactam-blocked 1,3- or 1,4-bis(1-cyanato-1-methylethyl)-benzene.

3. A thermosetting coating composition according to claim 2 wherein the amorphous polyester has a Tg greater than 55° C., a hydroxyl number of about 25 to 80, an acid number of not more than 20 and an inherent viscosity of about 0.15 to 0.45.

4. A thermosetting coating composition according to claim 2 wherein the semi-crystalline polyester has a Tg of less than 30° C., a melting point of 90° to 140° C., a hydroxyl number of about 30 to 80, an inherent viscosity of about 0.1 to 0.5, a number average molecular weight of about 2000 to 6000 and a heat of fusion (second heating cycle of differential scanning calorimetry) greater than 8 cal/g-°C. and the amorphous polyester has a Tg greater than 55° C., a hydroxyl number of about 25 to 80, an acid number of not more than 20 and an inherent viscosity of about 0.15 to 0.45.

5. A thermosetting coating composition according to claim 4 containing about 10 to 25 weight percent, based on the total weight of the semi-crystalline polyester, the amorphous polyester and the cross-linking agent, of ε-caprolactam-blocked 1,3-bis(1-isocyanato-1-methylethyl)benzene.

6. A thermosetting coating composition according to claim 2 containing a cross-linking catalyst.

7. A thermosetting coating composition according to claim 5 containing a cross-linking catalyst.

8. A thermosetting coating composition in the form of a powder having an average particle size of about 15 to 75 microns comprising:
   (1) a hydroxyl polyester component comprised of:
      (A) 40 to 60 weight percent of a semi-crystalline polyester having a Tg of less than 30° C., a melting point of 90° to 140° C., a hydroxyl number of about 30 to 80, an inherent viscosity of about 0.1 to 0.5, a number average molecular weight of about 2000 to 6000 and a heat of fusion (second heating cycle of differential scanning calorimetry) greater than 8 cal/g-°C. and comprised of:
         (i) diacid residues comprising about 80 to 98 mole percent terephthalic acid residues and about 2 to 20 mole percent 1,4-cyclohexanedicarboxylic acid residues, 1,3-cyclohexanedicarboxylic acid residues, adipic acid residues or a mixture thereof;
         (ii) diol residues comprising at least about 50 mole percent of residues having the formula —O—(CH$_2$)$_n$—O—wherein n is 4 to 12;
      (B) 60 to 40 weight percent, based on the weight of the hydroxyl polyester component, of an amorphous polyester having a glass transition temperature (Tg) of greater than 55° C., a hydroxyl number of about 25 to 80, an acid number of not more than 15 and an inherent viscosity of about 0.15 to 0.45 and comprised of:
         (i) diacid residues of which at least 50 mole percent are terephthalic acid residues;
         (ii) diol residues of which at least 50 mole percent are 2,2-dimethyl-1,3-propanediol residues; and
         (iii) up to 10 mole percent, based on the total moles of (ii) and trimethylolpropane, of trimethylolpropane residues;
   (2) about 5 to 30 weight percent, based on the total weight of (1) and (2), of ε-caprolactam-blocked 1,3- or 1,4-bis(1-isocyanato-1-methylethyl)benzene.

9. A thermosetting coating composition according to claim 7 wherein about 10 to 25 weight percent of the compound of (2) is present.

10. A thermosetting coating composition according to claim 8 containing a cross-linking catalyst and a flow 11. A thermosetting coating composition according to claim 10 containing about 10 to 25 weight percent of the compound of (2).

12. A thermosetting coating composition in the form of a powder having an average particle size of about 15 to 50 microns comprising:
(1) a blend of polymers containing free hydroxy groups comprised of:
 (A) about 40 to 60 weight percent of a semi-crystalline polyester having a Tg of less than 30° C., a melting point of 90° to 140° C., a hydroxyl number of about 30 to 80, an inherent viscosity of about 0.1 to 0.5, a number average molecular weight of about 2000 to 6000 and a heat of fusion (second heating cycle of differential scanning calorimetry) greater than 8 cal/g-°C. and comprised of:
  (i) diacid residues consisting essentially of about 85 to 95 mole percent terephthalic acid residues and about 5 to 15 mole percent 1,4-cyclohexanedicarboxylic acid residues; and
  (ii) diol residues consisting essentially of residues having the formula —O—(CH$_2$)$_n$—O— wherein n is 6 to 12;
 (B) about 60 to 40 weight percent of an amorphous polyester having a glass transition temperature of about 50° to 65° C., a hydroxyl number of about 35 to 60, an acid number of not more than 10 and an inherent viscosity of about 0.10 to 0.25 and comprised of:
  (i) diacid residues of which at least 50 mole percent are terephthalic acid residues;
  (ii) diol residues of which at least 50 mole percent are 2,2-dimethyl-1,3-propanediol residues; and
  (iii) up to 10 mole percent, based on the total moles of (ii) and trimethylolpropane, of trimethylolpropane residues;
(2) about 10 to 25 weight percent, based on the total weight of (1) and (2), of ε-caprolactam-blocked 1,3- or 1,4-bis(isocyanato-1-methylethyl)benzene;
(3) an acrylic polymer flow aid; and
(4) a cross-linking catalyst selected from organo-tin compounds.

13. A thermosetting coating composition according to claim 12 which also contains benzoin and wherein the semi-crystalline polyester component is comprised of diacid residues consisting of about 85 to 95 mole percent terephthalic acid residues and about 5 to 15 mole percent 1,4-cyclohexanedicarboxylic acid residues and diol residues consisting of 1,6-hexanediol residues.

14. An article coated with the reaction product of the composition of claim 1.

15. An article constructed of a metal coated with the reaction product of the composition of claim 2.

16. An article constructed of steel coated with the reaction product of claim 5.

17. An article constructed of steel coated with the reaction product of the composition of claim 12.

* * * * *